C. O. SILVER.
AUTOMATIC WAGON BRAKE.
APPLICATION FILED MAY 8, 1913.
1,106,247.
Patented Aug. 4, 1914.
2 SHEETS—SHEET 1.
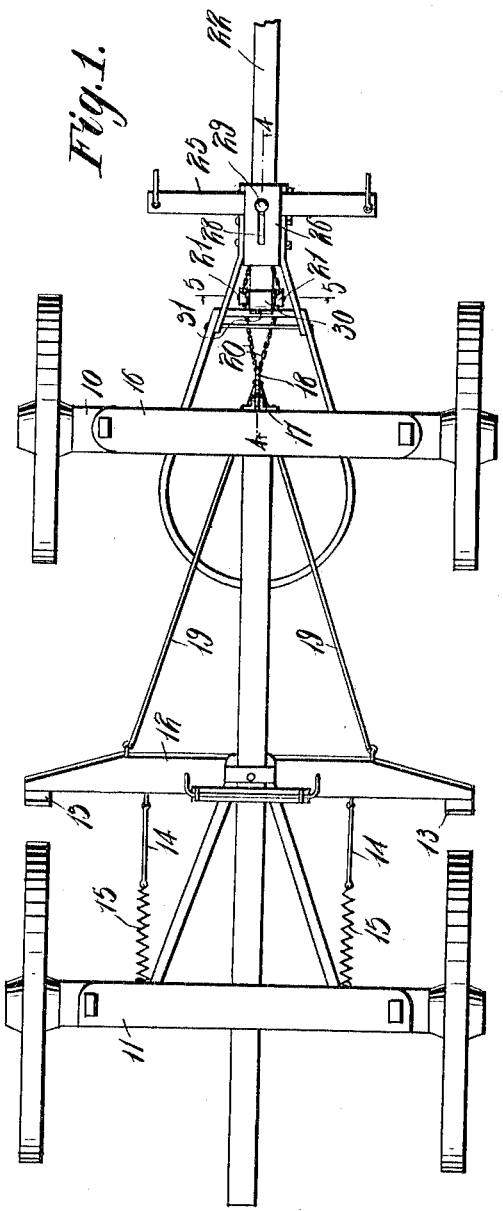
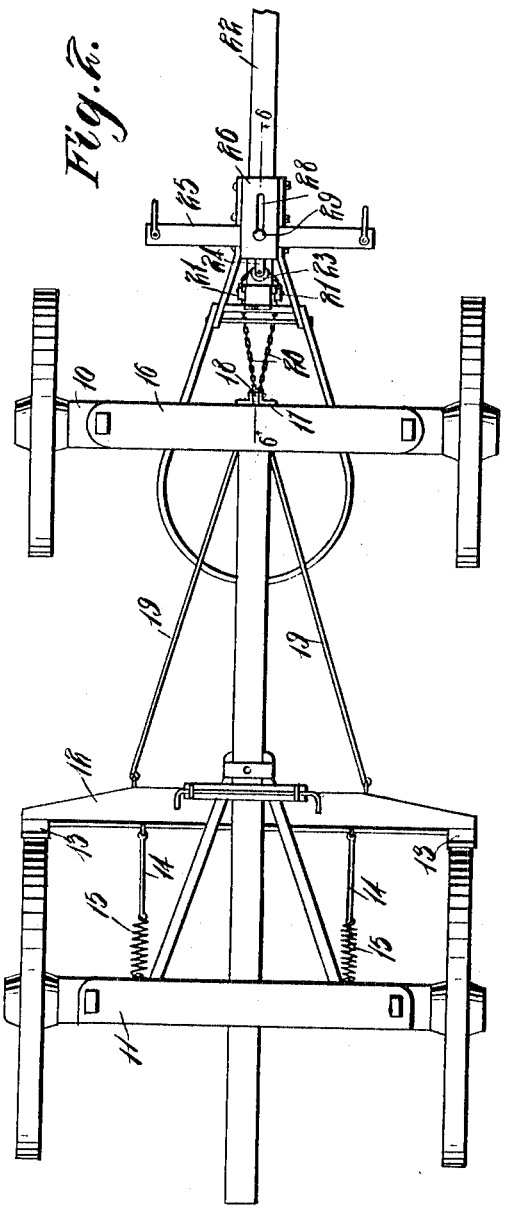
Witnesses
W. C. Fielding
Harry M. Test
Inventor
C. O. Silver
By Chandler & Chandler
Attorneys

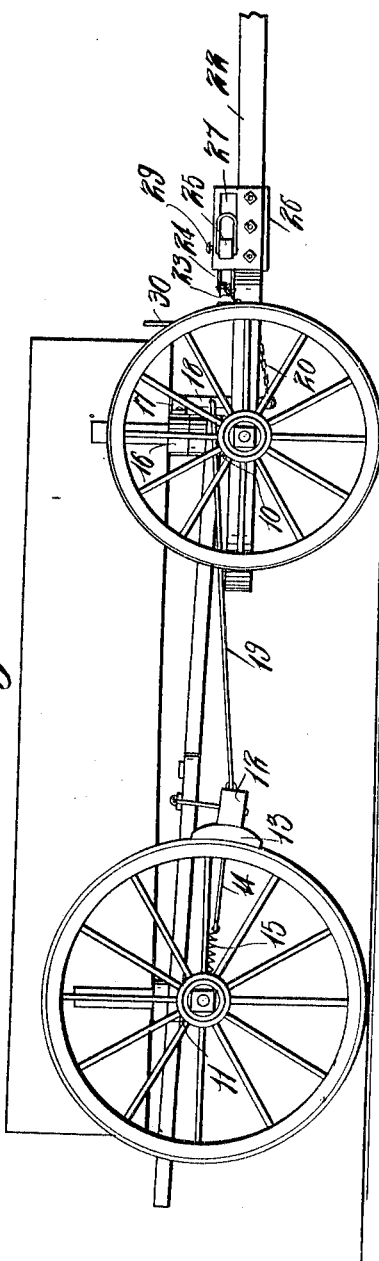

UNITED STATES PATENT OFFICE.

CHESTER O. SILVER, OF TRENTON, NEBRASKA.

AUTOMATIC WAGON-BRAKE.

1,106,247.  Specification of Letters Patent.  Patented Aug. 4, 1914.

Application filed May 8, 1913. Serial No. 766,366.

*To all whom it may concern:*

Be it known that I, CHESTER O. SILVER, a citizen of the United States, residing at Trenton, in the county of Hitchcock, State of Nebraska, have invented certain new and useful Improvements in Automatic Wagon-Brakes; and I do hereby declare the following to be a full, clear, and exact description of the invention, such as will enable others skilled in the art to which it appertains to make and use the same.

This invention relates to improvements in wagon brakes.

The principal object of the invention is to provide an automatic brake which will apply the shoes to the wheels when the horses stop, to prevent backward movement of the wagon as when climbing a hill.

A further object is to provide an automatic brake for wagons which can be thrown into or out of operation as desired.

Other objects and advantages will be apparent from the following description when taken in connection with the accompanying drawings.

In the drawings: Figure 1 is a plan view of the running gear on a wagon showing my invention applied thereto. Fig. 2 is a similar view showing the parts in operative position. Fig. 3 is a side elevation. Fig. 4 is an enlarged longitudinal section on the line 4—4 of Fig. 1. Fig. 5 is a transverse section on the line 5—5 of Fig. 1. Fig. 6 is an enlarged longitudinal section on the line 6—6 of Fig. 2. Fig. 7 is a perspective view of the housing. Fig. 8 is a perspective view of the member 30.

Referring particularly to the accompanying drawings, 10 represents the front axle and 11 the rear axle of the running gear. Disposed in front of the rear axle is the transversely arranged brake beam 12, which carries the brake shoes 13 on its ends. This brake beam is connected to the rear axle 11 by the rods 14 and springs 15.

The front axle carries the bolster 16, and pivoted in the bracket 17 carried centrally on the forward face of said bolster is a depending arm 18. Connected to this arm below the pivot thereof are the rods 19, these rods extending rearwardly where they are connected to the brake beam 12. Attached to the lower end of the arm 18 is an endless chain 20, the forward portion of this chain passing under the laterally extending guide rollers 21 carried by the end of the pole 22 and around a vertical guide roller 23 journaled in the rear ends of a bracket 24 secured to the doubletree 25. Carried by the pole is a housing 26 having longitudinal openings in the sides as shown at 27 through which project the opposite ends of the doubletree 25. In the top and bottom walls of the housing are formed longitudinal slots 28, the pivot pin or bolt 29 of the doubletree being passed through the upper and lower slots and through the center of the doubletree. Thus the doubletree has a pivotal movement and a sliding forward and rearward movement in the housing.

In normal position, that is, when the vehicle is being drawn, the doubletree is at the forward end of the housing 26. In this position, the chain 20 has actuated the arm 18 to draw on the rods 19 to hold the brake beam and shoes away from the wheels against the tension of the springs 15. Should the horses stop, as on a hill, the doubletree will be permitted to slide back to the rear of the housing, thus resulting in the spring 15 pulling the brake beam 12 rearwardly so that the shoes 13 engage the rear wheels.

With the device as thus far described, as soon as the horses stop pulling, the brakes are applied, thus making it impossible to back the vehicle. To permit the vehicle to be backed, I provide the device which will now be described.

Hinged on the rear end of the pole is an offset member 30, the free end of which is formed with a notch 31. By lifting the member 30 and swinging the same forwardly so that the pivot of the roller 23 engages in the notch 31, the doubletree will be prevented from rearward movement, thus enabling the vehicle to be backed without application of the brakes.

What is claimed is:

1. In a wagon brake, the combination with the running gear of a wagon, of a resiliently held brake beam, a depending arm carried by the front axle of the running gear, connections between the upper end of the arm and the brake beam, a longitudinal housing carried by the draft pole, a doubletree disposed transversely through the housing, the upper wall of the housing being provided with a longitudinal slot, a bolt carried by the doubletree and projecting through the slot, laterally disposed guide rollers carried by the pole, a rearward extension carried centrally on the doubletree, a vertically disposed guide roller carried by the extension, and an endless flexible member having its ends secured to the lower end of the beforementioned arm and having its intermediate portion trained around all of the said rollers.

2. In a wagon brake, the combination with the running gear of a wagon, of a resiliently held brake beam, a depending arm carried by the front axle of the running gear, connections between the upper end of the arm and brake beam, a longitudinal housing carried by the draft pole and having a longitudinal slot in the upper wall thereof, a doubletree disposed through the housing, a bolt disposed through the slot of the housing and secured to the doubletree, laterally disposed guide rollers carried by the pole, a vertically disposed guide roller carried by the doubletree, an endless flexible member connected to the lower end of the beforementioned arm and trained around said rollers, and pivotally carried means on the pole for holding the doubletree against slidable movement in the housing.

In testimony whereof, I affix my signature, in the presence of two witnesses.

CHESTER O. SILVER.

Witnesses:
GEO. A. BAKER,
BRUCE VASTINE.

Copies of this patent may be obtained for five cents each, by addressing the "Commissioner of Patents, Washington, D. C."